(12) United States Patent
Schmid et al.

(10) Patent No.: US 8,007,096 B2
(45) Date of Patent: Aug. 30, 2011

(54) INK COMPOSITIONS FOR USE IN HIGHLIGHTER MARKERS AND ASSOCIATED METHODS

(75) Inventors: Christian Schmid, Rancho Bernardo, CA (US); John L. Stoffel, San Diego, CA (US); Bill Sperry, Poway, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1013 days.

(21) Appl. No.: 10/696,344

(22) Filed: Oct. 29, 2003

(65) Prior Publication Data

US 2005/0093949 A1 May 5, 2005

(51) Int. Cl.
*G01D 11/00* (2006.01)
(52) U.S. Cl. .......................... 347/100; 347/95
(58) Field of Classification Search .............. 347/101, 347/100, 95, 96; 106/31.6, 31.27, 31.13; 523/160, 161
See application file for complete search history.

(56) References Cited

U.S. PATENT DOCUMENTS

| | | | |
|---|---|---|---|
| 5,279,652 A * | 1/1994 | Kaufmann et al. | 106/31.36 |
| 5,462,592 A | 10/1995 | Murakami et al. | |
| 5,723,179 A | 3/1998 | Wong et al. | |
| 6,066,439 A * | 5/2000 | Nohr et al. | 106/31.32 |
| 6,124,377 A | 9/2000 | Kaiser et al. | |
| 6,221,139 B1 | 4/2001 | Schut | |
| 6,319,309 B1 * | 11/2001 | Lavery et al. | 106/31.27 |
| 6,428,148 B1 | 8/2002 | Gore | |
| 6,436,178 B1 | 8/2002 | Hosmer | |
| 6,458,193 B1 | 10/2002 | VanDahm | |
| 6,536,893 B2 | 3/2003 | Kowalski | |
| 6,632,858 B1 | 10/2003 | Pears et al. | |
| 6,639,120 B1 | 10/2003 | Wallajapet et al. | |
| 7,012,105 B2 | 3/2006 | Wallajapet et al. | |
| 7,317,135 B2 | 1/2008 | Wallajapet et al. | |
| 7,604,694 B2 | 10/2009 | Denninger et al. | |
| 2002/0156153 A1 | 10/2002 | Tsang et al. | |
| 2003/0082350 A1 | 5/2003 | Tsao | |
| 2003/0226474 A1 * | 12/2003 | Mammen et al. | 106/31.15 |
| 2004/0110869 A1 * | 6/2004 | Denninger et al. | 523/160 |

FOREIGN PATENT DOCUMENTS

| | | |
|---|---|---|
| EP | 1239014 | 9/2002 |
| JP | 63-061065 * | 3/1988 |
| JP | 63-61065 | 3/1988 |
| JP | 6361065 | 3/1988 |
| JP | 64087676 | 3/1989 |
| JP | 81-08682 | 4/1996 |
| JP | 8108682 | 4/1996 |
| JP | 2000327540 | 11/2000 |
| JP | 2002508220 | 3/2002 |
| JP | 2002519224 | 7/2002 |
| WO | WO9731070 | 8/1997 |
| WO | WO9930751 | 6/1999 |
| WO | WO02061003 | 8/2002 |
| ZA | 9810779 | 9/1999 |

OTHER PUBLICATIONS

Ascorbic Acid (PIM 046) (http://www.inchem.org/documents/pims/pharm/ascorbic.htm) pp. 1-3 (Jan. 24, 2006).*
Acid dissociation constant- Wikipedia, the free encyclopedia (http://en.wikipedia.org/wiki/Acidity_constant) pp. 1-3 (Jan. 24, 2006).*
Acetic acid- Wikipedia, the free encyclopedia (http://en.wikipedia.org/wiki/Acetic_acid) pp. 1-10 (Jan. 24, 2006).*

* cited by examiner

*Primary Examiner* — Manish S Shah

(57) ABSTRACT

Highlighter ink compositions can be prepared which provide improved abilities to reduce smear during highlighting. Highlighter ink compositions can include an acid buffer having a pKa from about 2 to about 6, a highlighter colorant, and a liquid vehicle. The image for highlighting can be formed on the substrate using any conventional printing technique, such as ink-jet printing or other printing techniques. Application of the highlighter ink compositions of the present invention to a printed image results in a reduced degree of image smear, particularly when the image was produced by an ink-jet printing process. Further, the acid buffer can be configured for reducing mobility of specific ink-jet colorants. In this way, the highlighter ink composition can be specifically tailored for reducing smear of various printed inks.

32 Claims, No Drawings

INK COMPOSITIONS FOR USE IN HIGHLIGHTER MARKERS AND ASSOCIATED METHODS

FIELD OF THE INVENTION

The present invention relates generally to highlighter ink compositions. More particularly, the present invention relates to components used in highlighter markers to reduce smearing of ink-jet ink text or images upon highlighting.

BACKGROUND OF THE INVENTION

Highlighters have become a popular way of marking printed media such as text and/or images in both educational and professional settings. A variety of printed media are commonly printed using techniques such as laser printing, offset printing, ink-jet printing, and the like. Ink-jet printing offers a versatile and inexpensive way to print text and/or images. However, ink-jet printed images can be subject to undesirable smearing and poor waterfastness. One common problem with ink-jet inks is that of smearing when using a highlighter to mark an image. Specifically, the solvents in the highlighter ink can cause a portion of the colorants of the ink-jet composition to be displaced. This results in moderate blurring of the image and/or undesirable colored streaks in the highlighted area. Additionally, some of the ink-jet ink can be transferred to the highlighter, damaging the marker tip.

The ink-jet industry has attempted to reduce these effects using a number of techniques. One common method is to develop ink-jet ink compositions that are smear resistant and exhibit improved waterfastness. A number of these attempts have seen moderate success; however such methods often introduce additional costs and steps in the production of the ink-jet ink. Other approaches for reducing smear of printed images have attempted to design highlighter markers with a physical construction that minimizes smear. For example, the highlighter tip shape and/or material can be modified to reduce smear. However, such methods often require a change in tooling for manufacturers, which may not always be desirable. For these and other reasons, the need still exists for improved methods for reducing smear when highlighting ink-jet text and images.

SUMMARY OF THE INVENTION

It has been recognized that it would be advantageous to provide improved abilities to reduce smear during highlighting. In one aspect of the present invention, a highlighter ink composition can include an acid buffer having a pKa from about 2 to about 6, a highlighter colorant, and a liquid vehicle. The highlighter ink compositions of the present invention can be applied to an image on a substrate. In one detailed aspect, the image can be formed on the substrate by ink-jet printing an ink-jet ink. Application of the highlighter ink compositions of the present invention to a printed image results in a reduced degree of image smear. In yet another aspect of the present invention, the highlighter ink composition can include an acid buffer, such that the acid buffer is configured for reducing mobility of an ink-jet colorant. In this way, the highlighter ink composition can be specifically tailored for reducing smear of ink-jet printed ink(s).

Additional features and advantages of the invention will be apparent from the detailed description that follows, which illustrates, by way of example, features of the invention.

DETAILED DESCRIPTION

Reference will now be made to exemplary embodiments and specific language will be used herein to describe the same. It will nevertheless be understood that no limitation of the scope of the invention is thereby intended. Alterations and further modifications of the inventive features described herein, and additional applications of the principles of the invention as described herein, which would occur to one skilled in the relevant art and having possession of this disclosure, are to be considered within the scope of the invention. Further, before particular embodiments of the present invention are disclosed and described, it is to be understood that this invention is not limited to the particular process and materials disclosed herein as such may vary to some degree. It is also to be understood that the terminology used herein is used for the purpose of describing particular embodiments only and is not intended to be limiting, as the scope of the present invention will be defined only by the appended claims and equivalents thereof.

In describing and claiming the present invention, the following terminology will be used.

The singular forms "a," "an," and "the" include plural referents unless the context clearly dictates otherwise. Thus, for example, reference to "a highlighter colorant" includes reference to one or more of such materials.

As used herein, "acid buffer" refers to a chemical compound or compounds in a composition which act to maintain the pH in a desired acidic range. Typically, such acid buffers can include a weak acid and a corresponding conjugate weak base. Upon the addition of an acid or a base, properly selected acid buffers will allow only minor changes in pH of a highlighted image.

As used herein, "fluorescent colorant" refers to a colorant having a fluorescent color. Fluorescent colors are those which exhibit luminescence in the form of visible radiation. Fluorescent colorants can include dyes, pigments, and the like which provide such visible color to a composition.

As used herein, "pKa" is related to acid dissociation, and can be used to quantify the strength of an acid. Specifically, pKa is the pH at which half of the acid is dissociated and half of the acid is not dissociated. Strong acids generally have a pKa less than about 3, and weak acids typically have a pKa greater than about 3.

As used herein, "print smear" refers to a movement of printed colorants on a substrate, which reduces edge acuity and sharpness of printed images. In context of the present invention, print smear is frequently associated with highlighting of a previously printed image. Typically, print smear can be measured using a visual scale of 0% to 100% acceptable appearance of an image based on the perceived degree of smear.

As used herein, "mobility" refers to the extent of movement of printed colorants on a substrate which are subjected to highlighting. Unless otherwise noted, mobility refers to movement after drying and printing of the image and during application of a highlighter ink composition.

As used herein, "image" refers to marks, signs, symbols, figures, indications, and/or appearances deposited upon a substrate with either a visible or an invisible ink composition. Examples of an image can include characters, words, numbers, alpha-numeric symbols, punctuation, text, lines, underlines, highlights, and the like.

As used herein, the term "marker" or "highlighter" includes any contact instrument or device that can be used to overstrike a printed image, and is not intended to merely include a single type of marking device. In describing certain embodiments, when referring to the use of a highlighter, it is not to be inferred that such a device is the only type of over-striking device that can be used.

As used herein, "liquid vehicle" is defined to include liquid compositions that can be used to carry an acid buffer, highlighter colorant, and/or other components to a substrate. Liquid vehicles are well known in the art, and a wide variety of liquid vehicles may be used in accordance with embodiments of the present invention. Such liquid vehicles may include a mixture of a variety of different agents, including without limitation, surfactants, solvents, co-solvents, buffers, biocides, viscosity modifiers, stabilizing agents, complexing agents, and water. Though a variety of agents are described that can be used, the liquid vehicle, in some embodiments, can be simply a single liquid component, such as water. Further, unless specifically stated otherwise, all concentrations and composition values are given in weight percent.

As used herein, "effective amount" refers to at least the minimal amount of a substance or agent, which is sufficient to achieve a desired effect. For example, an effective amount of a "liquid vehicle" is at least the minimum amount required in order to create an ink composition, while maintaining properties necessary for effective application or ink-jetting.

Further, the term "about" when referring to a numerical value or range is intended to encompass the values resulting from experimental error that can occur when taking measurements.

Concentrations, amounts, and other numerical data may be presented herein in a range format. It is to be understood that such range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. For example, a concentration range of about 1 wt % to about 20 wt % should be interpreted to include not only the explicitly recited limits of 1 wt % and about 20 wt %, but also to include individual concentrations such as 2 wt %, 3 wt %, 4 wt %, and sub-ranges such as 10 wt % to 15 wt %, 2 wt % to 10 wt %, etc.

In accordance with the present invention, a highlighter ink composition can include an acid buffer having a pKa from about 2 to about 6, a highlighter colorant, and a liquid vehicle. The highlighter ink compositions of the present invention can further be configured for use in connection with marking of specific ink-jet inks. Accordingly, the present invention provides improved smear resistance during marking of printed images using the highlighter compositions of the present invention.

Acid Buffer

The highlighter ink compositions of the present invention can include an acid buffer having a pKa from about 2 to about 6. In one detailed aspect, the acid buffer can have a pKa from about 4 to about 6. Suitable acid buffers can include, without limitation, succinic acid, citric acid, glutaric acid, acetic acid, beta-alanine, aspartic acid, ascorbic acid, and mixtures thereof. In one embodiment of the present invention, the acid buffer can be succinic acid.

The acid buffer can comprise any amount of the highlighter ink composition which is functional to obtain the desired degree of smear reduction. However, as a general guideline, the acid buffer can comprise from about 0.5 wt % to about 10 wt % of the highlighter ink composition. In one detailed aspect, the acid buffer can comprise from about 3 wt % to about 8 wt % of the highlighter ink composition. In another detailed aspect, the acid buffer can comprise from about 2 wt % to about 3 wt % of the highlighter ink composition.

Highlighter Colorant

In accordance with the present invention, the highlighter ink compositions can include a highlighter colorant. The highlighter colorant can provide a bright and easily identifiable color to the ink. Any suitable highlighter colorant can be used in the compositions of the present invention and can be almost of almost any color, either fluorescent or non-fluorescent. For example, though a typical highlighter color is yellow, other colors can be used, e.g., orange, blue, red, green, pink, purple, and combinations of these colors. Non-limiting examples of several suitable highlighter colorants include Basic Yellow 40, Acid Yellow 23, Acid Red 52, Acid Blue 9, and mixtures thereof. Further, although some of the highlighter ink colorants can be acid dyes, the addition of an acid buffering agent in accordance with the present invention can further reduce smearing of images during highlighting.

In one aspect, the highlighter colorant can be a fluorescent colorant which can be a pigment or a dye. Suitable fluorescent pigments can be either dispersed in aqueous or organic liquid vehicles. In one additional aspect of the present invention, the fluorescent colorant can be an acid-functionalized pigment. Suitable fluorescent pigments are typically available as a powder of a transparent synthetic resin matrix having a fluorescent dye dissolved therein together with other optional components such, as ultraviolet radiation absorbers. Solution type fluorescent pigments are commercially available, and include, MPI pigment series (available from Nippon Keiko Kagaku K.K.) such as MPI-501, 502, 503, 504, 505, 506, 507, 508, 501C, 503C, 504C, 505C, 506C, 507C and 508C; FM-10 and FM-100 series (available from Sinloich Co., Ltd.) such as FM-11, 12, 13, 14, 15, 16, 17, 18, 25, 27, 103, 104, 105, 106, 107 and 108; and Flare 410 series (available from Sterling Industrial Colours Ltd.) such as 41031 Yellow, 41035 Rose, 41037 Magenta, 41022 Brightener and 41022N Brightener. Other commercial fluorescent colorants include PANAX fluorescent pigments (available from Ukseung Chemical Co., Ltd.) and AQ series of water soluble pigments (available from Cardinal Color Inc.).

Further, fluorescent colorants can be fluorescent dyes which are dispersed within or soluble in an organic resin. Additionally, the fluorescent colorants can be used either singly or as a mixture to produce a wide variety of colors or to effect properties of the highlighter ink composition, such as pH and the like.

The highlighter colorant can be included in the highlighter ink composition of the present invention in any amount that is sufficient to provide a visible color to the composition when applied to a substrate. The amount of highlighter colorant which is sufficient to provide a strong visible color can vary significantly depending on the specific colorant. Typically, the highlighter colorant can comprise from about 0.5 wt % to about 20 wt % of the highlighter ink composition. In one detailed aspect of the present invention, the highlighter colorant can comprise from about 1 wt % to about 10 wt % of the composition.

Additional Composition Considerations

The highlighter ink compositions of the present invention can be configured to reduce smear of a printed image during highlighting. Each of the components of the composition can potentially influence the effectiveness of achieving a desirable degree of smear reduction.

One component of the present invention which can affect the degree of smear reduction is the liquid vehicle. As mentioned above, the liquid vehicle can include almost any liquid capable of carrying the highlighter colorant and acid buffer to a substrate. Typically, the liquid vehicle can evaporate or dry within a short period of time, leaving the colorant on the substrate. In some embodiments, it is desirable that the liquid vehicle evaporate or dry in less than about several seconds. However, the liquid vehicle can also be carefully chosen so as to also preserve a commercially viable shelf-life for the highlighter ink composition. Additionally, a liquid vehicle which remains on the substrate for extended periods of time can allow for undesirable mobility of the printed colorants and can cause excessive curling of some substrates. Non-limiting examples of suitable solvents for use in a liquid vehicle can include water, diethylene glycol, polyethylene glycol, glycerol, dipropylene glycol, propylene glycol, polypropylene glycol, 2-pyrrolidinone, and mixtures thereof.

In an additional aspect of the present invention, the acid buffer can be configured such that upon contact with a printed image, the pH is maintained within a range of about 3 to about 6. In one embodiment of the present invention, the specific desirable pH range can be related to the ink used to print the image. Specifically, the image can be formed using any known printing technology such as, but not limited to, offset, ink-jet, laser, gravure, roller coating, screen printing or other application methods known to those skilled in the art. Further, the images can be handwritten images using any number of known inks. A wide variety of inks are known for creating images using the above printing techniques. Of particular interest are images printed using ink-jet inks. Despite continued efforts to improve waterfastness of ink-jet inks, such compositions are significantly more susceptible to smearing than laser toner inks, offset inks, and the like, each of which typically include a polymeric binder. A great deal of effort is expended in preparing ink-jettable compositions that are stable during storage in an ink-jet cartridge and also have good waterfastness properties upon printing. Formulation of such ink-jet inks is often a careful balance of permanence after printing, as well as reliability and long-term storage prior to printing.

Ink-jetting techniques generally involve deposition of an ink-jet ink onto a printing surface using continuous ink deposit or drop-on-demand ink deposit systems. Regarding drop-on-demand printing systems, the ink-jet inks are typically based upon water and solvents such as glycols. Essentially, with these systems, ink droplets are propelled from a nozzle by heat or by a pressure wave such that all of the ink droplets ejected are used to form the printed image.

In general, ink-jet inks are either dye- or pigment-based inks. Both are typically prepared in an ink vehicle that contains the dye and/or the pigment. Dye-based ink-jet inks generally use a liquid colorant that is usually water-based to deposit a specific color onto the media. Conversely, pigmented inks typically use a solid or dispersed colorant to achieve color.

Ink-jet ink compositions are typically prepared in an aqueous formulation that can include water, cosolvents, surfactants, buffering agents, biocides, sequestering agents, viscosity modifiers, humectants, binders, and/or other known additives. The type of ink-jet pigments that can be used is not particularly limited, as inorganic pigments or organic pigments may be used. Common inorganic pigments include, for example, titanium oxide, cobalt blue ($CoO$—$Al_2O_3$), chrome yellow ($PbCrO_4$), and iron oxide. Several common organic pigments include, for example, azo pigments, polycyclic pigments (e.g., phthalocyanine pigments, perylene pigments, perynone pigments, anthraquinone pigments, quinacridone pigments, dioxazine pigments, thioindigo pigments, isoindolinone pigments and quinophthalone pigments), dye chelates (e.g., basic dye type chelates and acidic dye type chelates), nitropigments, nitroso pigments, and the like. The above-illustrated pigments can be used singly or in combination of two or more.

Colored ink-jet dyes which can be used include, without limitation, anionic water-soluble dyes and their ions, and any other known dyes. Though any effective amount of dye can be used in this system, the dye can be an anionic dye. Examples of suitable anionic dyes include a large number of water-soluble acid and direct dyes. Specific examples of anionic dyes include the Pro-Jet series of dyes available from Avecia Ltd., Aminyl Brilliant Red F-B (Sumitomo Chemical Co.), the Duasyn line of "salt-free" dyes available from Hoechst, and mixtures thereof. Further examples include Tricon Acid Red 52, Tricon Direct Red 227, and Tricon Acid Yellow 17 (Tricon Colors Incorporated), Bernacid Red 2BMN, Pontamine Brilliant Bond Blue A, BASF X-34, Pontamine, Food Black 2, Catodirect Turquoise FBL Supra Conc. (Direct Blue 199, Carolina Color and Chemical), Special Fast Turquoise 8GL Liquid (Direct Blue 86, Mobay Chemical), Intrabond Liquid Turquoise GLL (Direct Blue 86, Crompton and Knowles), Cibracron Brilliant Red 38-A (Reactive Red 4, Aldrich Chemical), Drimarene Brilliant Red X-2B (Reactive Red 56, Pylam, Inc.), Levafix Brilliant Red E-4B (Mobay Chemical), Levafix Brilliant Red E-6BA (Mobay Chemical), Pylam Certified D&C Red #28 (Acid Red 92, Pylam), Direct Brill Pink B Ground Crude (Crompton & Knowles), Cartasol Yellow GTF Presscake (Sandoz, Inc.), Tartrazine Extra Conc. (FD&C Yellow #5, Acid Yellow 23, Sandoz, Inc.), Catodirect Yellow RL (Direct Yellow 86, Carolina Color and Chemical), Cartasol Yellow GTF Liquid Special 110 (Sandoz, Inc.), D&C Yellow #10 (Yellow 3, Tricon), Yellow Shade 16948 (Tricon), Basacid Black X34 (BASF), Carta Black 2GT (Sandoz, Inc.), Neozapon Red 492 (BASF), Orasol Red G (Ciba-Geigy), Direct Brilliant Pink B (Crompton-Knolls), Aizen Spilon Red C-BH (Hodagaya Chemical Company), Kayanol Red 3BL (Nippon Kayaku Company), Levanol Brilliant Red 3BW (Mobay Chemical Company), Levaderm Lemon Yellow (Mobay Chemical Company), Aizen Spilon Yellow C-GNH (Hodagaya Chemical Company), Spirit Fast Yellow 3G, Sirius Supra Yellow GD 167, Cartasol Brilliant Yellow 4GF (Sandoz), Pergasol Yellow CGP (Ciba-Geigy), Orasol Black RL (Ciba-Geigy), Orasol Black RLP (Ciba-Geigy), Savinyl Black RLS (Sandoz), Dermacarbon 2GT (Sandoz), Pyrazol Black BG (ICI Americas), Morfast Black Conc A (Morton-Thiokol), Diazol Black RN Quad (ICI Americas), Orasol Blue GN (Ciba-Geigy), Savinyl Blue GLS (Sandoz, Inc.), Luxol Blue MBSN (Morton-Thiokol), Sevron Blue 5GMF (ICI Americas), and Basacid Blue 750 (BASF); Levafix dyes available from Bayer; Procion dyes available from ICI Americas; Cibacron Red F-B, Cibacron Black BG, Lanasol Black B, Lanasol Red 5B, Lanasol Red B, and Lanasol Yellow 46, all available from Ciba-Geigy; Baslien dyes available from BASF; Sumifix dyes available from Sumitomo Chemical Company; Intracron dyes available from Crompton and Knowles, Dyes and Chemicals Division; mixtures thereof, and the like.

Although the above lists of colored pigments and dyes are provided, they are in no way intended to be limiting of the present invention and it will be understood that other known pigments and/or dyes can be used in an ink-jet ink for use in conjunction with the highlighter ink compositions of the present invention. As is well known in the art, typical colored ink-jet colorants can comprise from about 0.1 wt % and about 25 wt % of the ink-jet ink, and can often be present at from 2 wt % and 10 wt %.

Various buffering agents are also often used in ink-jet ink compositions. Depending on the specific ink-jet colorants used in the ink-jet inks, the pH can be buffered to maintain a value from about 4 to about 9. Buffering agents can be either organic buffers or inorganic buffers. Typical buffering agents include such pH control solutions as hydroxides of alkali metals and amines, such as lithium hydroxide, sodium hydroxide, potassium hydroxide; citric acid; amines such as triethanolamine, diethanolamine, and dimethylethanolamine; alkali phosphates such as sodium phosphate; morpholinosulfonic acids such as 4-morpholinoethane sulfonic acid and 4-morpholinepropanesulfonic acid; and other basic or acidic components which do not interfere with the jetability of the ink-jet ink. If used, buffering agents typically comprise less than about 10% by weight of the ink-jet ink composition.

As noted above, ink-jet inks are solvent based inks wherein the colorants are chosen and specifically designed to be soluble or dispersed in common solvents such as water and alcohols. Therefore, application of a highlighter ink containing similar solvents can cause the ink-jet colorants to dissolve or disperse into the highlighter ink composition as it is applied to the surface. The diffusion of components in the solvent and the physical motion of the highlighter marker can carry the ink-jet colorants away from their initially printed positions. As a result, the printed image often loses edge acuity and colored streaks can occur.

Furthermore, many ink-jet pigments are dispersed using carboxylic-acid functional groups. Such functionalized ink-jet pigments can be formed either by covalently attaching acid containing moieties to the pigments (as in CABOJET 300, available from Cabot Corporation) or by non-covalently adsorbing acid-containing polymers onto the pigments. These functional groups have an advantage that under acidic conditions (pH<7), the functional groups are protonated, lose their charge, and hence can cause the pigment to coagulate or crash. This advantage allows pigments to be crashed on the paper surface, allowing for improved optical density, edge acuity, and bleed resistance. By using the highlighter inks in accordance with embodiments of the present invention, the acid buffer can be specifically tailored to prevent the ink-jet colorants from dissolving or otherwise becoming dislodged from their initially printed positions. In particular, the present invention would be useful when used with such functionalized pigments as described above.

The following examples illustrate exemplary embodiments of the invention. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what is presently deemed to be practical embodiments of the invention.

EXAMPLES

Example 1

A highlighter ink composition was prepared by forming a solution having 16 wt % glycerol, 2 wt % Basic Yellow 40, and balance water. The highlighter ink composition was placed into an empty AVERY EVERBOLD highlighter marker. Images were printed on a several commercially available papers, i.e. Hewlett-Packard Bright White, Hammermill Color Copy, Hewlett-Packard Multipurpose, GREAT WHITE Ink-jet (available from International Paper Co.), and Multicopy Original (available from Stora Enso). The images were printed using black ink-jet ink from an HP 5550 ink jet printer to form a series of 2 mm wide bars having an optical density of about 1.40. The images were then highlighted using the highlighter ink composition using a mechanism that applies a downward force of about 300 grams.

Smear was measured using a visual scale based on the percentage of print samples averaged over the five substrates that appear clear with minimal smearing after one and two passes of the highlighter marker. The results indicated 0% acceptable for both one and two passes.

Example 2

The same procedure was followed as in Example 1, except the highlighter ink was prepared by forming a solution having 16 wt % glycerol, 2 wt % Basic Yellow 40, 3 wt % succinic acid, and balance water. The results indicated 60% acceptable for one pass and 0% for two passes of the highlighter marker.

Example 3

The same procedure was followed as in Example 1, except the highlighter ink was prepared by forming a solution having 16 wt % glycerol, 2 wt % Basic Yellow 40, 6 wt % succinic acid, and balance water. The results indicated 60% acceptable for one pass and 0% for two passes of the highlighter marker.

Example 4

The same procedure was followed as in Example 1, except the highlighter ink was prepared by forming a solution having 16 wt % glycerol, 2 wt % Basic Yellow 40, 3 wt % citric acid, and balance water. The results indicated 40% acceptable for one pass and 0% for two passes of the highlighter marker.

Example 5

A similar procedure was followed as in Example 1, except the highlighter ink was prepared by forming a solution having 16 wt % dipropylene glycol, 2 wt % Acid Yellow 23 dye, and balance water. Furthermore, the ink-jet image generated contained narrow lines, with thickness equivalent to that of 10 point type (rather than the 2 mm thick printed bars of examples 1-4, which typically results in greater smearing due to greater amounts of continuous ink). The results indicated 100% acceptable for one pass and 25% for two passes.

Example 6

The same procedure was followed as in Example 5, except the highlighter ink was prepared by forming a solution having 16 wt % dipropylene glycol, 2 wt % Acid Yellow 23 dye, 3 wt % succinic acid, and balance water. The results indicated 100% acceptable for one pass and 100% for two passes.

It is to be understood that the above-referenced arrangements are illustrative of the application for the principles of the present invention. Numerous modifications and alternative arrangements can be devised without departing from the spirit and scope of the present invention while the present invention has been described above in connection with the exemplary embodiments(s) of the invention. It will be apparent to those of ordinary skill in the art that numerous modifications can be made without departing from the principles and concepts of the invention as set forth in the claims.

What is claimed is:
1. A highlighter ink composition, comprising:
   a) an acid buffer having a pKa from about 2 to about 6;
   b) a highlighter colorant that is an acid-functionalized pigment or a fluorescent colorant; and
   c) a liquid vehicle.

2. The composition of claim 1, wherein said acid buffer is selected from the group consisting of succinic acid, citric acid, glutaric acid, acetic acid, beta-alanine, aspartic acid, ascorbic acid, and mixtures thereof.

3. The composition of claim 2, wherein said acid buffer is succinic acid.

4. The composition of claim 1, wherein said acid buffer has a pKa from about 4 to about 6.

5. The composition of claim 1, wherein said acid buffer comprises from about 0.5 wt % to about 10 wt % of the composition.

6. The composition of claim 5, wherein said acid buffer comprises from about 2 wt % to about 3 wt % of the composition.

7. The composition of claim 1, wherein said highlighter colorant is selected from the group consisting of Basic Yellow 40, Acid Yellow 23, Acid Red 52, Acid Blue 9, and mixtures thereof.

8. The composition of claim 1, wherein said highlighter colorant is the acid-functionalized pigment.

9. The composition of claim 1, wherein said highlighter colorant is the fluorescent colorant.

10. The composition of claim 1, wherein said highlighter colorant comprises from about 0.5 wt % to about 20 wt % of the composition.

11. The composition of claim 10, wherein said highlighter colorant comprises from about 1 wt % to about 10 wt % of the composition.

12. The composition of claim 1, wherein said liquid vehicle comprises a member selected from the group consisting of water, diethylene glycol, polyethylene glycol, glycerol, dipropylene glycol, propylene glycol, polypropylene glycol, 2-pyrrolidinone, and mixtures thereof.

13. A method of reducing print smear during highlighting, comprising the steps of:
  a) ink-jet printing an ink-jet ink to form an image on a substrate;
  b) applying a highlighter composition to the image, said highlighter composition including an acid buffer having a pKa from about 2 to about 6, a highlighter colorant that is an acid-functionalized pigment or a fluorescent colorant, and a liquid vehicle.

14. The method of claim 13, wherein said acid buffer is selected from the group consisting of succinic acid, citric acid, glutaric acid, acetic acid, beta-alanine, aspartic ascorbic acid, and mixtures thereof.

15. The method of claim 14, wherein said acid buffer is succinic acid.

16. The method of claim 13, wherein said acid buffer has a pKa from about 4 to about 6.

17. The method of claim 13, wherein said highlighter colorant is selected from the group consisting of Basic Yellow 40, Acid Yellow 23, Acid Red 52, Acid Blue 9, and mixtures thereof.

18. The method of claim 13, wherein said acid buffer is configured for reducing mobility of colorants in the ink-jet ink upon contact therewith.

19. A smear resistant highlighter system, comprising:
  a) an ink-jet ink printed on a substrate, said ink-jet ink comprising an ink-jet colorant; and
  b) a highlighter composition comprising an acid buffer having a pKa from about 2 to about 6, a highlighter colorant that is an acid-functionalized pigment or a fluorescent colorant, and a liquid vehicle, wherein said acid buffer is configured for reducing mobility of the ink jot colorant.

20. The system of claim 19, wherein said acid buffer is selected from the group consisting of succinic acid, citric acid, glutaric acid, acetic acid, beta-alanine, aspartic acid, ascorbic acid, and mixtures thereof.

21. The system of claim 20, wherein said acid buffer is succinic acid.

22. The system of claim 19, wherein said acid buffer has a pKa from about 4 to about 6.

23. The system of claim 19, wherein said acid buffer comprises from about 0.5 wt % to about 10 wt % of the composition.

24. The system of claim 23, wherein said acid buffer comprises from about 2 wt. % to about 3 wt % of the composition.

25. The system of claim 19, wherein said ink jet colorant is selected from the group consisting of as inorganic pigment, organic pigment, anionic water-soluble dye, and mixtures thereof.

26. The system of claim 19, wherein said liquid vehicle comprises a member selected from the group consisting of water, diethylene glycol, polyethylene glycol, glycerol, dipropylene glycol, propylene glycol, polypropylene glycol, 2-pyrrolidinone, and mixtures thereof.

27. The composition of claim 1, wherein said acid buffer is a weak acid.

28. The composition of claim 1, wherein said acid buffer includes a weak base.

29. The method of claim 13, wherein said acid buffer is a weak acid.

30. The method of claim 13, wherein said acid buffer includes a weak base.

31. The system of claim 19, wherein said acid buffer is a weak acid.

32. The system of claim 19, wherein said acid buffer includes a weak base.

* * * * *

UNITED STATES PATENT AND TRADEMARK OFFICE
CERTIFICATE OF CORRECTION

PATENT NO.        : 8,007,096 B2
APPLICATION NO.   : 10/696344
DATED             : August 30, 2011
INVENTOR(S)       : Christian Schmid et al.

Page 1 of 1

It is certified that error appears in the above-identified patent and that said Letters Patent is hereby corrected as shown below:

In column 9, line 46, in Claim 14, delete "aspartic" and insert -- aspartic acid, --, therefor.

In column 10, line 15, in Claim 19, delete "ink jot" and insert -- ink-jet --, therefor.

In column 10, line 29, in Claim 24, delete "2 wt. %" and insert -- 2 wt % --, therefor.

In column 10, line 30, in Claim 25, delete "ink jet" and insert -- ink-jet --, therefor.

Signed and Sealed this
Tenth Day of July, 2012

David J. Kappos
*Director of the United States Patent and Trademark Office*